US012801230B2

(12) United States Patent
Takahashi

(10) Patent No.: US 12,801,230 B2
(45) Date of Patent: Nov. 17, 2026

(54) MULTI-DIRECTIONAL INPUT DEVICE

(71) Applicant: Alps Alpine Co., Ltd., Tokyo (JP)

(72) Inventor: Takenori Takahashi, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 19/178,315

(22) Filed: Apr. 14, 2025

(65) Prior Publication Data

US 2026/0147422 A1 May 28, 2026

(30) Foreign Application Priority Data

Apr. 24, 2024 (JP) ................................ 2024-070330

(51) Int. Cl.
*G06F 3/0362* (2013.01)

(52) U.S. Cl.
CPC ................................ *G06F 3/0362* (2013.01)

(58) Field of Classification Search
CPC .... G06F 3/0362; G06F 3/0338; G06F 3/0383; G01D 5/30; G05G 1/10; G05G 9/047; G05G 2009/04718; G05G 2009/04759
See application file for complete search history.

(56) References Cited

U.S. PATENT DOCUMENTS

2020/0097037 A1 * 3/2020 Asano .................... H01H 25/04

FOREIGN PATENT DOCUMENTS

JP U3211625 7/2017
JP 2021-51908 4/2021
JP 3234725 U * 10/2021 ............ G05G 9/047

* cited by examiner

*Primary Examiner* — Stacy Khoo
(74) *Attorney, Agent, or Firm* — Beyer Law Group LLP

(57) ABSTRACT

A multi-directional input device includes a housing, a swinging body swingably supported in an accommodation space, a first and a second interlocking members rotatably supported with an X direction and a Y direction as rotation centers, respectively, and a first and a second detection means detecting rotations of the first and the second interlocking members, respectively. The first detection means includes a first slider linearly driven in a direction orthogonal to the X direction by the first swing arm and a first position detection means detecting a position of the first slider, and the second detection means includes a second slider linearly driven in a direction orthogonal to the Y direction by the second swing arm and a second position detection means detecting a position of the second slider, and the first slider and the second slider are linearly movably supported by the X1 wall and the Y1 wall, respectively.

9 Claims, 9 Drawing Sheets

MULTI-DIRECTIONAL INPUT DEVICE

CLAIM OF PRIORITY

This application claims benefit of Japanese Patent Application No. 2024-070330 filed on Apr. 24, 2024, which is hereby incorporated by reference.

BACKGROUND OF THE INVENTION

1. Field of the Invention

The present disclosure relates to a multi-directional input device.

2. Description of the Related Art

Japanese Registered Utility Model No. 3211625 discloses a multi-directional rocker adjustment control device. In this multi-directional rocker adjustment control device, the adjustment control assembly is fitted into the housing chamber between the base and housing. The adjustment control assembly includes a shaft core, an upper end rocker arm and a lower end rocker arm. The rocker is attached to the lower end of the shaft core, the upper end of the rocker fits into the shaft core attachment hole in the shaft core, and a spring is attached between the rocker and the shaft core. The upper end rocker arm includes an upper end driving unit and an upper end positioning unit, and the upper end driving unit drives the first rotation potentiometer. The lower end rocker arm includes a lower end first driving unit and a lower end second driving unit. The lower end first driving unit drives the second rotation potentiometer and the lower end second driving unit drives the touch switch. Two, oppositely positioned engaging units are provided at the lower end of the shaft core, each of engaging units is fit into an engaging hole of the lower end rocker arm, and the contact position limiting bump is provided near each engaging section on the outer face of the lower end of the shaft core.

The Japanese Unexamined Patent Application Publication No. 2021-051908 discloses a multi-directional input device with good output accuracy. This multi-directional input device includes a case, an operation shaft, which is an operation member that protrudes upward from the inside of the case to the outside and can be tilt operated in any direction around it, an upper arm, which is a first interlocking member, and a lower arm, which is a second interlocking member, both of which move in response to the tilting operation of the operation shaft, extend in a state in which they are orthogonal to each other, and are held inside the case, and a first variable resistor as a first detection unit and a second variable resistor as a second detection unit, which detect the movement of the upper arm and the lower arm, respectively, and includes a first spring portion and a second spring portion which bias the upper arm and the lower arm downward, respectively.

SUMMARY OF THE INVENTION

The multi-directional input device, for example, operates a swinging body swingably supported with the X direction and the Y direction as the rotation axes, and the amount of change based on the tilt angle of the swinging body is detected by a detection means ("detection unit") to obtain the respective operation amounts of the swinging body around the X axis and the Y axis. Here, in Japanese Registered Utility Model No. 3211625, the operation amount is obtained by detecting a change in the angle of rotation of the swinging body, and in Japanese Unexamined Patent Application Publication No. 2021-051908, the operation amount is obtained by converting the rotational movement of the swinging body into a linear movement. In such a multi-directional input device, it is desirable to be able to accurately detect the amount of operation of the swinging body and to be able to downsize the device.

The present invention provides a multi-directional input device that can reduce the size of the device as well as improve detection accuracy.

A multi-directional input device according to an aspect of the present invention includes a housing having an X1 wall and an X2 wall disposed opposite to each other along an X direction with an accommodation space interposed therebetween, and a Y1 wall and a Y2 wall disposed opposite to each other along a Y direction orthogonal to the X direction with the accommodation space interposed therebetween, a swinging body swingably supported in the accommodation space with the X direction and the Y direction as rotation centers, a first interlocking member that is rotatably supported by the X1 wall and the X2 wall with a first rotation axis as a rotation center, the first rotation axis being parallel to the X direction, and rotates in conjunction with a swing of the swinging body, a second interlocking member that is rotatably supported by the Y1 wall and the Y2 wall with a second rotation axis as a rotation center, the second rotation axis being parallel to the Y direction, and rotates in conjunction with a swing of the swinging body, a first detection means ("first detection unit") configured to detect a rotation of the first interlocking member, and a second detection means ("second detection unit") configured to detect a rotation of the second interlocking member, wherein the first interlocking member includes a first swing arm extending radially from the first rotation axis, and the second interlocking member includes a second swing arm extending radially from the second rotation axis, wherein the first detection unit includes a first slider linearly movably supported in a direction orthogonal to the X direction and linearly driven by the first swing arm and a first position detection means ("first position detector") configured to detect a position of the first slider, wherein the second detection unit includes a second slider linearly movably supported in a direction orthogonal to the Y direction and linearly driven by the second swing arm and a second position detection means ("second position detector") configured to detect a position of the second slider, wherein the first slider is linearly movably supported by the X1 wall, and wherein the second slider is linearly movably supported by the Y1 wall.

According to this configuration, the swing of the swinging body is converted to the linear movement by the first slider and the second slider, and the positions of the first slider and the second slider due to such linear movement are detected by the first position detector and the second position detector. In this way, the amount of change based on the swinging of the swinging body is converted to a linear direction and the position is detected, so that the detection error is unlikely to occur. Since the first slider is linearly movably supported by the X1 wall and the second slider is linearly movably supported by the Y1 wall, the outward extension of the first detection unit and the second detection unit to the outside of the housing is suppressed.

In the above multi-directional input device, the first slider may include a sliding contact member linearly driven along the X1 wall, and the first position detector may include a resistor pattern that is laid linearly along the X1 wall and which the sliding contact member slidably contacts. As a result, the resistor pattern is laid along the first wall, so that the amount of protrusion of the first position detector outward from the X1 wall is suppressed.

In the above multi-directional input device, the resistor pattern may be laid inside a sensor housing including a flat plate portion parallel to the X1 wall and a peripheral wall extending in a direction orthogonal to the flat plate portion from around the flat plate portion and is attached to an outside of the X1 wall, and wherein the sliding contact member may be attached to a slide block linearly slidably supported inside the sensor housing. As a result, the resistor pattern, the sliding contact member, and the slide block are accommodated in the sensor housing, and the sensor block is attached along the X1 wall.

The above multi-directional input device may include a leaf spring member that is attached to the peripheral wall and elastically biases the slide block toward the resistor pattern. This ensures that the sliding contact member supported by the slide block contacts the resistor pattern by the elastic biasing force of the leaf spring member.

In the above multi-directional input device, one of the leaf spring member and the slide block may have a convex portion protruding toward the other, and the other of the leaf spring member and the slide block may have a concave portion that is disengageable with the convex portion, wherein the slide block may be configured to return to a predetermined position when one of the convex portion and the concave portion elastically contacts the other. This makes it easier to return the slide block to the position where the convex portion and the concave portion engage with each other.

In the above multi-directional input device, the first slider may be configured to be linearly movably supported by the X1 wall via a first sensor housing attached to the X1 wall, and wherein the second slider may be configured to be linearly movably supported by the Y1 wall via a second sensor housing attached to the Y1 wall. As a result, the first slider and the second slider are attached to the X1 wall and the Y1 wall with respect to the first sensor housing and the second sensor housing, respectively.

DESCRIPTION OF THE PREFERRED EMBODIMENTS

Hereinafter, embodiments of the present invention will be described in detail with reference to the accompanying drawings. In the following description, identical parts and materials are marked with the identical signs, and parts and materials that have been described once are omitted from the description as appropriate.

Multi-Directional Input Device

Figure 1:
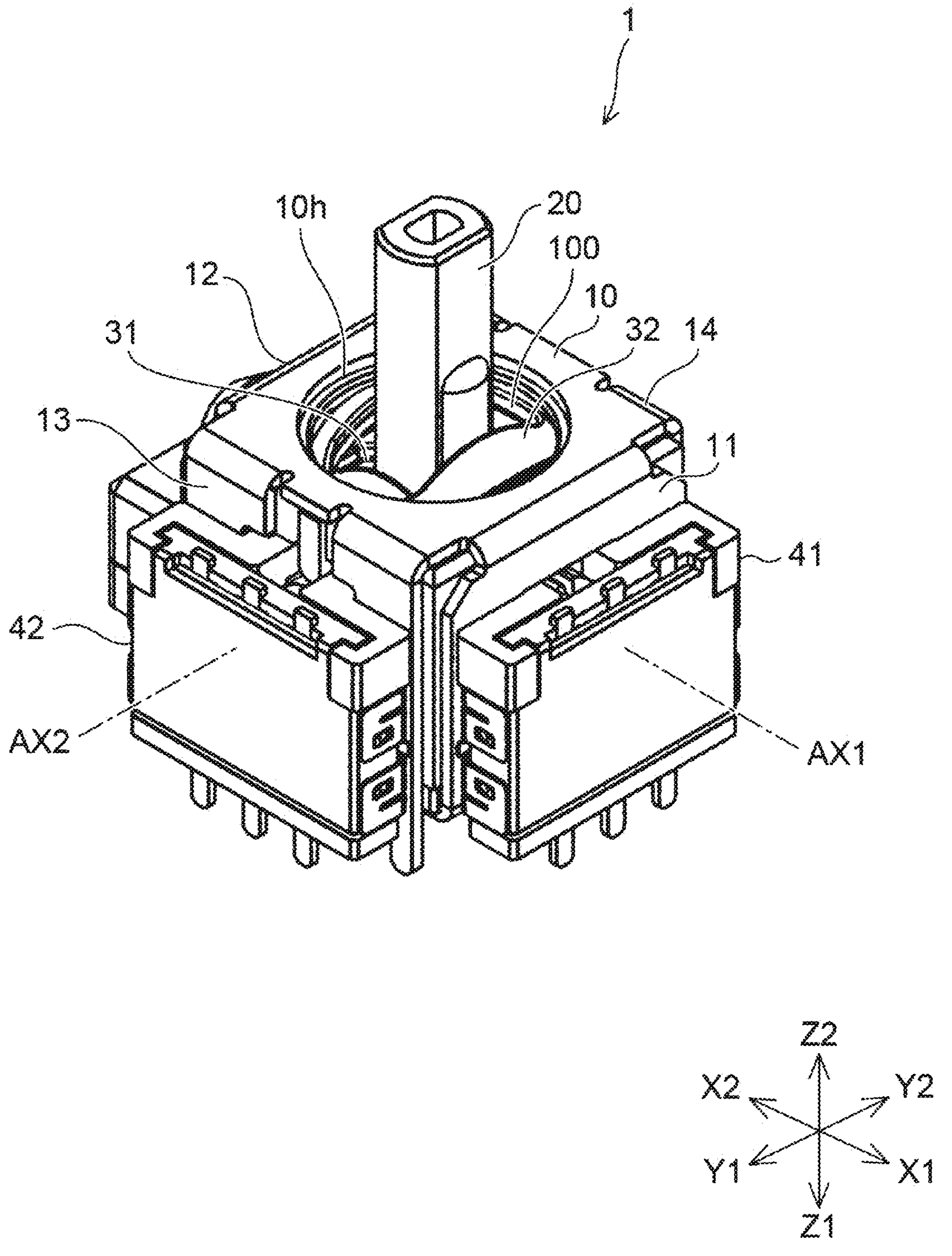
FIG. 1 is an external perspective view illustrating the multi-directional input device according to the present embodiment.
Figure 2:
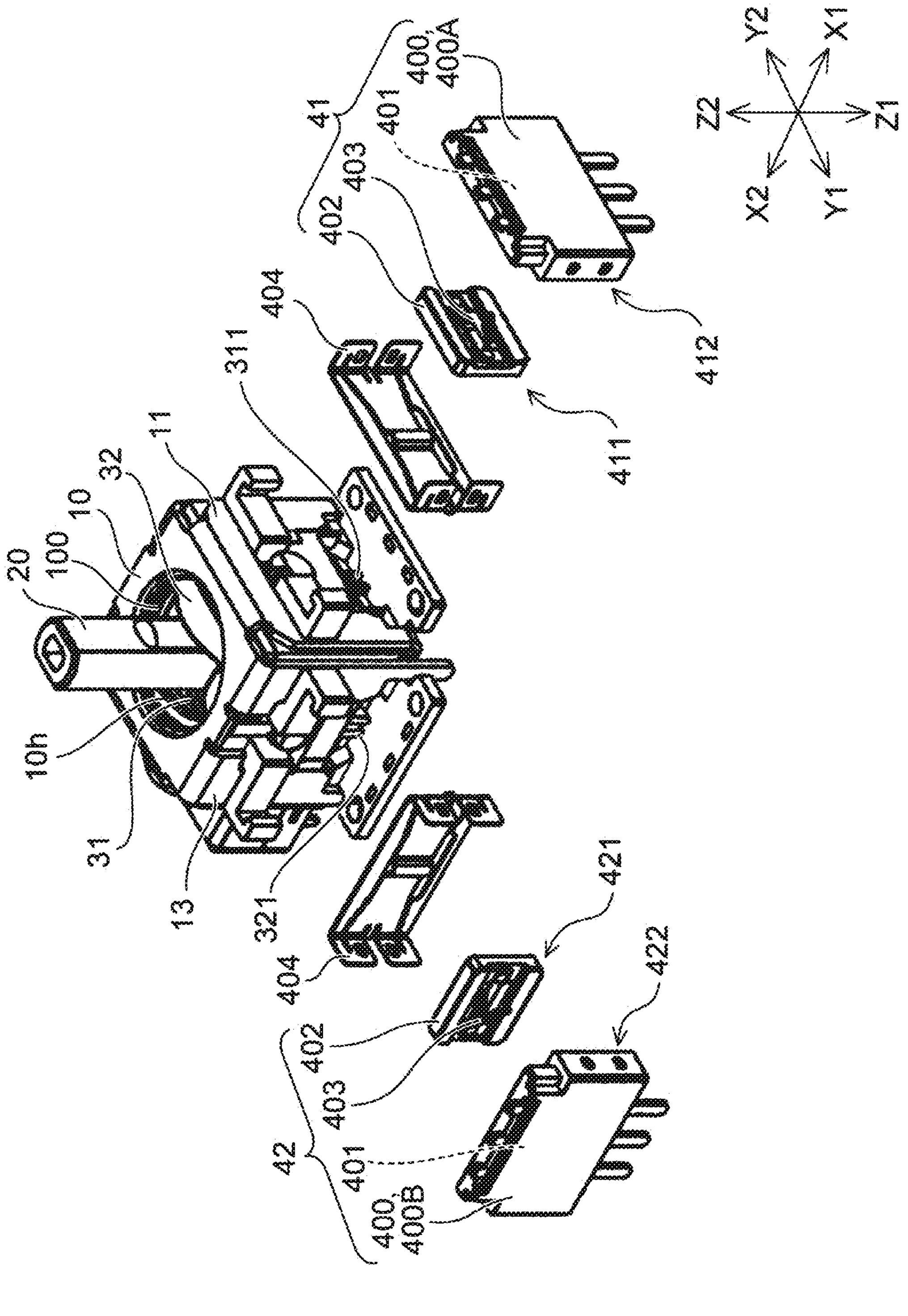
FIG. 2 is a partial exploded perspective view illustrating the multi-directional input device according to the present embodiment.
Figure 3:
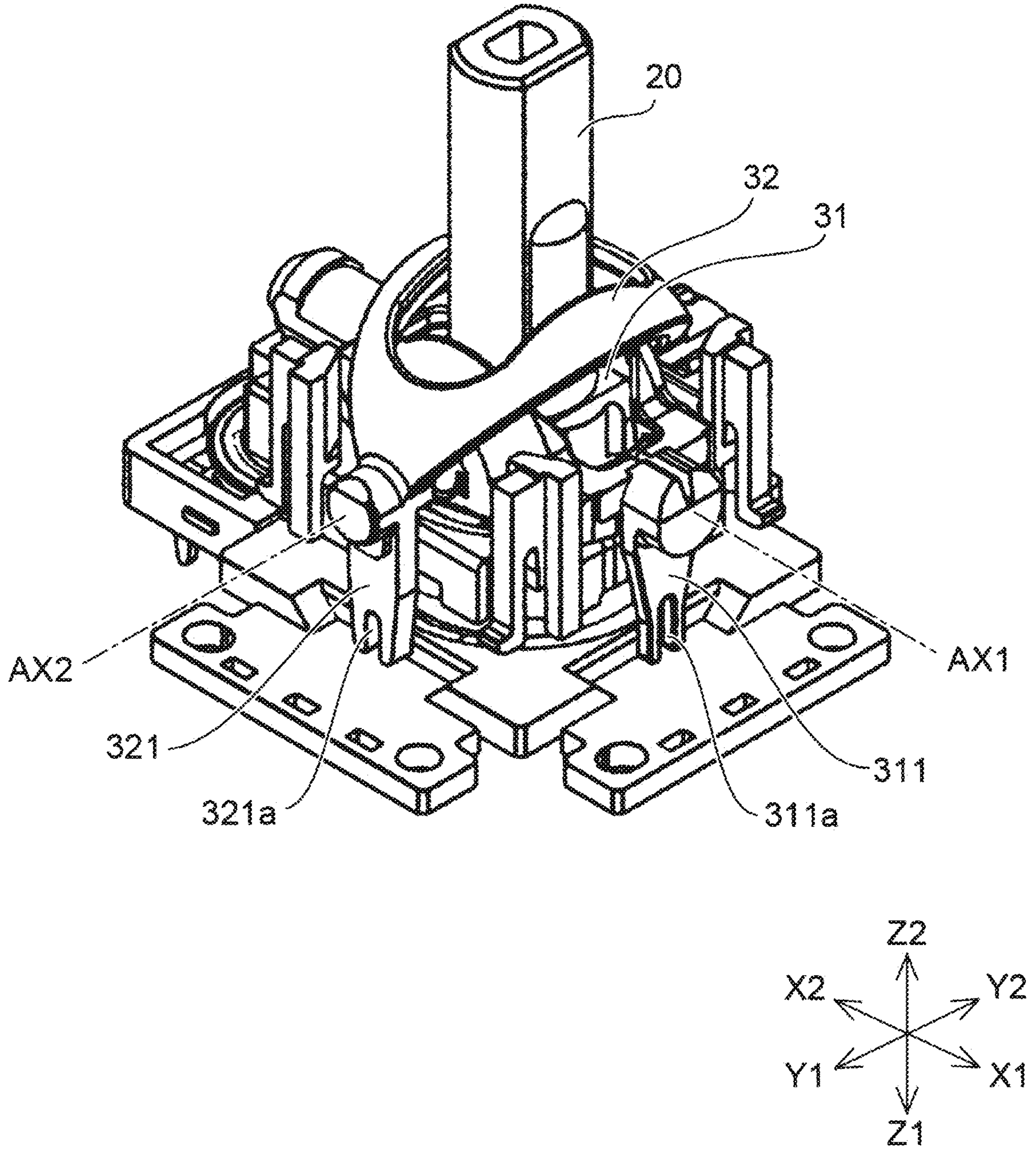
FIG. 3 is a perspective view illustrates the configuration of the inside of the housing of the multi-directional input device according to the present embodiment.

FIG. 1 is an external perspective view illustrating the multi-directional input device according to the present embodiment. FIG. 2 is a partial exploded perspective view illustrating the multi-directional input device according to the present embodiment. FIG. 3 is a perspective view illustrates the configuration of the inside of the housing of the multi-directional input device according to the present embodiment. A multi-directional input device 1 according to the present embodiment is a device that receives input by swinging (tilting) a swinging body 20, which is an operation member. In the description of the embodiment, a rotation axis parallel to the X1-X2 direction (X direction), which is one of the axes of rotation in the tilting motion of the swinging body 20, is a first rotation axis AX1, and a rotation axis parallel to the Y1-Y2 direction (Y direction) orthogonal to the X1-X2 direction, the Y1-Y2 direction being the other one of the rotation axes, is a second rotation axis AX2. The direction orthogonal to the X1-X2 direction and the Y1-Y2 direction is the Z1-Z2 direction.

The multi-directional input device 1 includes a housing 10 having an accommodation space 100, a swinging body 20 swingably supported in the accommodation space 100, a first interlocking member 31 and a second interlocking member 32 that rotate in conjunction with a swing of the swinging body 20, and a first detection means ("first detection unit") 41 and a second detection means ("second detection unit") 42 that detect rotation of the first interlocking member 31 and second interlocking member 32.

The housing 10 includes an X1 wall 11 and an X2 wall 12 that face each other in the X1-X2 direction with the accommodation space 100 interposed therein, and a Y1 wall 13 and a Y2 wall 14 that face each other in the Y1-Y2 direction with the accommodation space 100 interposed therein. The housing 10 has an opening 10*h* on the Z2 side of the Z1-Z2 direction, and the swinging body 20 extends from within the accommodation space 100 to the Z1-Z2 direction Z2 side through the opening 10*h*.

The swinging body 20 is swingably supported in the accommodation space 100 with the first rotation axis AX1 and the second rotation axis AX2 as the rotation centers. As a result, the swinging body 20 can tilt in a direction of 360° when viewed in the Z1-Z2 direction.

The swing of the swinging body 20 is transmitted to the first interlocking member 31 and the second interlocking member 32. The first interlocking member 31 is rotatably supported by the X1 wall 11 and the X2 wall 12 with the first rotation axis AX1 as the rotation center and rotates in conjunction with the swinging of the swinging body 20. The second interlocking member 32 is rotatably supported by the Y1 wall 13 and the Y2 wall 14 with the second rotation axis AX2 as the rotation center, and rotates in conjunction with the swinging of the swinging body 20. As a result, the tilting motion of the swinging body 20 when viewed in the Z1-Z2 direction is divided into a rotational motion of the first interlocking member 31 around the first rotation axis AX1 as the rotation center and a rotational motion of the second interlocking member 32 around the second rotation axis AX2 as the rotation center.

The first interlocking member 31 includes a first swing arm 311 extending from the first rotation axis AX1 to the Z1 side along the Z1-Z2 direction, which is the radial direction. The second interlocking member 32 includes a second swing arm 321 that extends from the second rotation axis AX2 to the Z1 side along the Z1-Z2 direction, which is the radial direction.

The first swing arm 311 and the second swing arm 321 extend opposite to the swinging body 20 with the first rotation axis AX1 and the second rotation axis AX2 as the centers. As a result, when the swinging body 20 is rotated around the first rotation axis AX1, the first swing arm 311 swings in the direction opposite to the swinging body 20. When the swinging body 20 is rotated around the second rotation axis AX2, the second swing arm 321 swings in the direction opposite to the swinging body 20.

The rotational motion of the first interlocking member 31 around the first rotation axis AX1 as a rotation center is detected by the first detection means 41, and the rotational motion of the second interlocking member 32 around the second rotation axis AX2 as a rotation center is detected by the second detection means 42.

The first detection means 41 has a first slider 411 linearly movably supported in a direction orthogonal to the first rotation axis AX1 and a first position detection means ("first position detector) 412 detecting the position of the first slider 411. The first slider 411 is linearly driven in the Y1-Y2 direction in response to the swinging movement of the first swing arm 311. The first slider 411 is linearly movably supported by the X1 wall 11 of the housing 10.

The second detection means 42 includes a second slider 421 linearly movably supported in a direction orthogonal to the second rotation axis AX2 and a second position detection means ("second position detector") 422 that detects the position of the second slider 421. The second slider 421 is linearly driven in the X1-X2 direction in response to the swinging movement of the second swing arm 321. The second slider 421 is linearly movably supported by the Y1 wall 13 of the housing 10.

In this way, since the first detection means 41 and the second detection means 42 are attached to the X1 wall 11 and the Y1 wall 13 of the housing 10, the first slider 411 is linearly movably supported by the X1 wall 11, and the second slider 421 is linearly movably supported by the Y1 wall 13, the outward extension of the first detection means 41 and the second detection means 42 to the outside of the housing 10 is suppressed. Thus, the multi-directional input device 1 can be downsized.

Detection Unit

Figure 4:
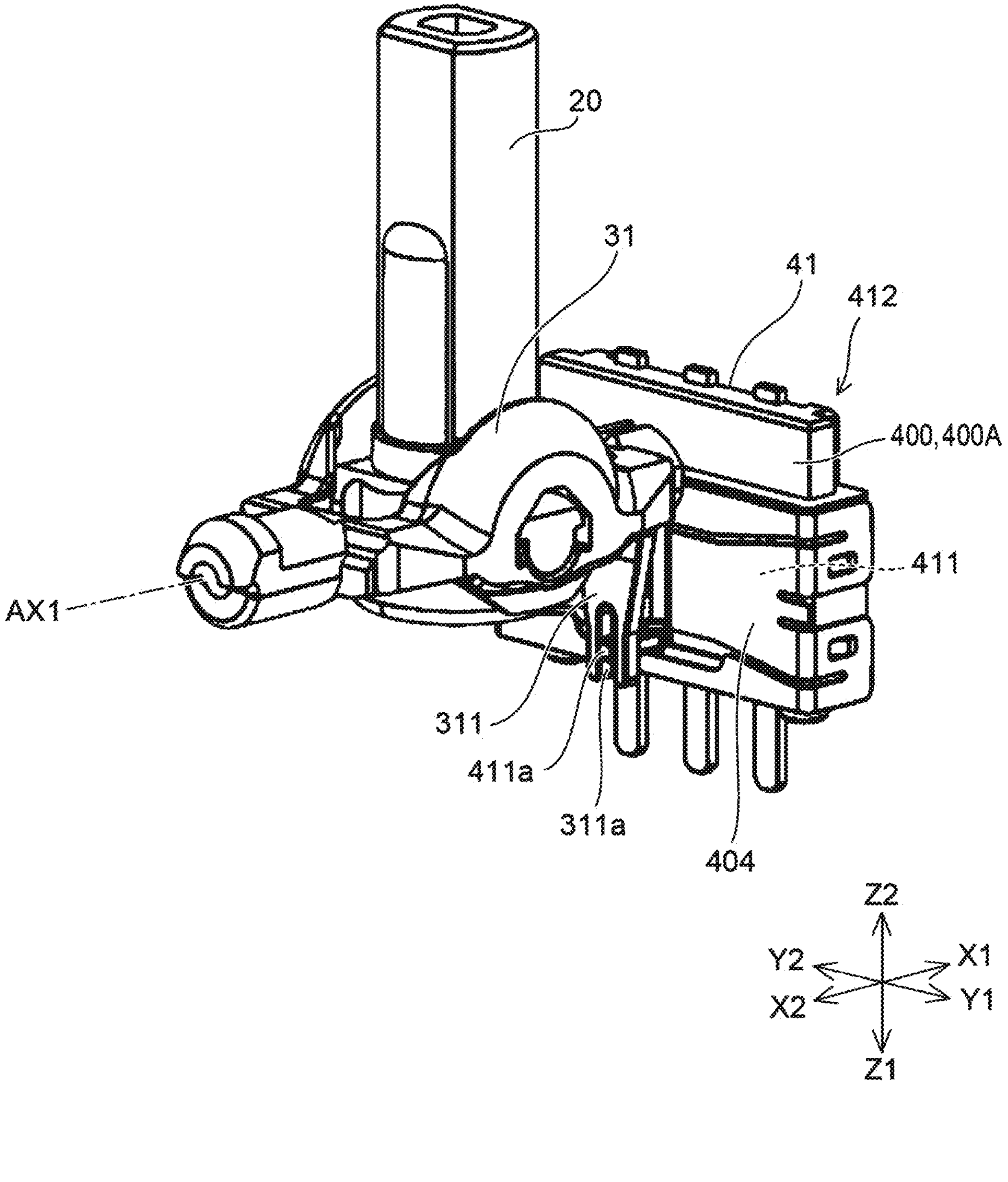
FIG. 4 is a perspective view describing the state of engagement of the first detection means and the first swing arm.
Figure 5:
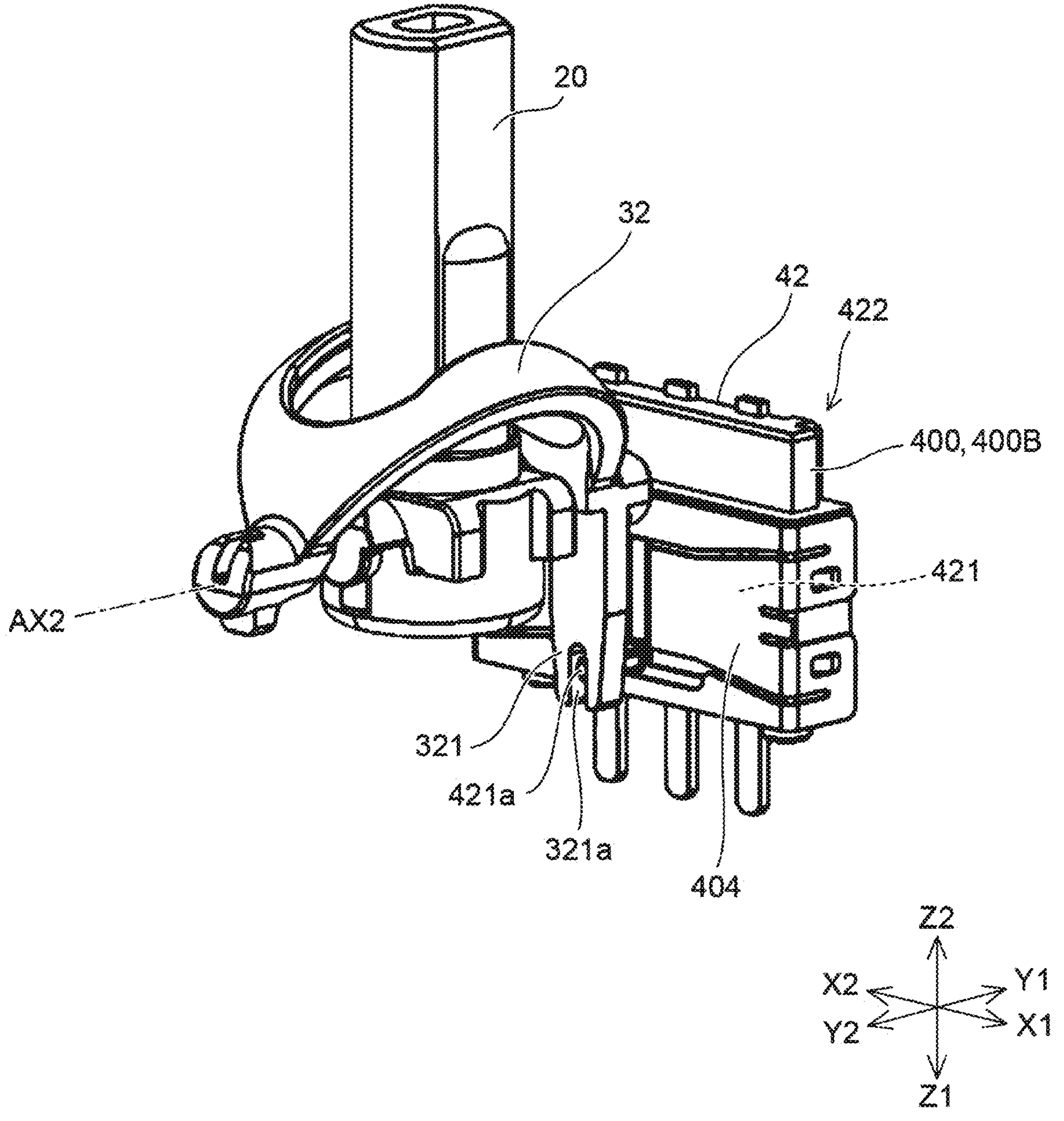
FIG. 5 is a perspective view describing the state of engagement of the second detection means and the second swing arm.
Figure 6:
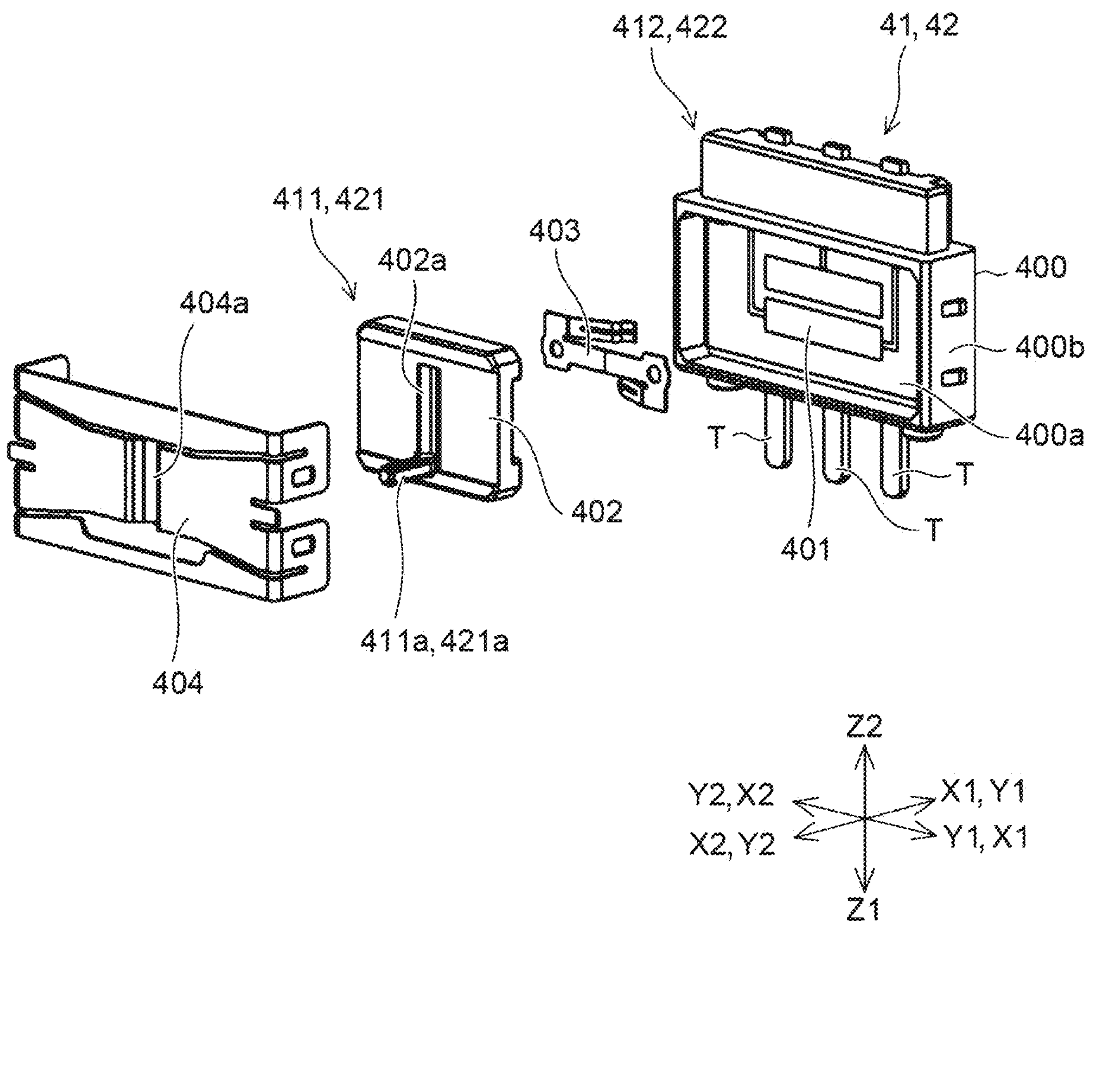
FIG. 6 is an exploded perspective view of the detection means.

FIG. 4 is a perspective view describing the state of engagement of the first detection means ("first detection unit") and the first swing arm. FIG. 5 is a perspective view illustrates the state of engagement of the second detection means ("second detection unit") and the second swing arm. FIG. 6 is an exploded perspective view of the detection means ("detection unit"). Since the configuration of the first detection means 41 and the second detection means 42 are the same, the configuration of the second detection means 42 same as that of the first detection means 41 is marked with a common sign in FIG. 6. In FIG. 6, the sign in parentheses is a sign indicating the configuration of the second detection means 42 corresponding to the configuration of the first detection means 41.

As shown in FIGS. 4 and 6, the first slider 411 of the first detection means 41 includes a first protrusion pin 411*a* that protrudes in the X2 direction of the X1-X2 direction. The first protrusion pin 411*a* is provided in the center of the first slider 411 in the Y1-Y2 direction and is engaged with the first swing arm 311 of the first interlocking member 31. The first swing arm 311 includes a first slit 311*a*. The first slit 311*a* extends in the Z1-Z2 direction and has a width in the Y1-Y2 direction approximately equal to the diameter of the first protrusion pin 411*a*. The first protrusion pin 411*a* is fitted into the first slit 311*a*.

A change in the relative position of the first swing arm 311 and the first protrusion pin 411*a* is allowed in the direction of extension of the first slit 311*a*, but not allowed in the direction of width of the first slit 311*a*. Therefore, when the first interlocking member 31 and the first swing arm 311 swing in conjunction with the swinging body 20, the swing of the first swing arm 311 is converted into a linear motion of the first slider 411 in the Y1-Y2 direction via the first protrusion pin 411*a*.

As shown in FIGS. 5 and 6, the second slider 421 of the second detection means 42 includes a second protrusion pin 421*a* that protrudes in the Y2 direction of the Y1-Y2 direction. The second protrusion pin 421*a* is provided in the center of the second slider 421 in the X1-X2 direction and is engaged with the second swing arm 321 of the second interlocking member 32. The second swing arm 321 includes a second slit 321*a*. The second slit 321*a* extends in the Z1-Z2 direction, and has a width in the X1-X2 direction approximately equal to the diameter of the second protrusion pin 421*a*. The second protrusion pin 421*a* is fitted into the second slit 321*a*.

A change in the relative position of the second swing arm 321 and the second protrusion pin 421*a* is allowed in the direction of extension of the second slit 321*a*, but not allowed in the direction of width of the second slit 321*a*. Therefore, when the second interlocking member 32 and the second swing arm 321 swing in conjunction with the swinging body 20, the swing of the second swing arm 321 is converted into a linear motion of the second slider 421 in the X1-X2 direction via the second protrusion pin 421*a*.

As shown in FIG. 6, each of the first detection means 41 and the second detection means 42 includes a sensor housing 400, a resistor pattern 401 provided inside the sensor housing 400, a slide block 402, and a sliding contact member 403. A first sensor housing 400A, which is the sensor housing 400 of the first detection means 41, includes a flat plate portion 400*a* parallel to the X1 wall 11 (see FIG. 1) and a peripheral wall 400*b* extending in a direction orthogonal to the flat plate portion 400*a* from around the flat plate portion 400*a*. A second sensor housing 400B, which is the sensor housing 400 of the second detection means 42, includes the flat plate portion 400*a* parallel to the Y1 wall 13 (see FIG. 1) and the peripheral wall 400*b* extending in a direction orthogonal to the flat plate portion 400*a* from around the flat plate portion 400*a*. The sensor housing 400 of the first detection means 41 is attached to the outside of the X1 wall 11, and the sensor housing 400 of the second detection means 42 is attached to the outside of the Y1 wall 13. As a result, the first slider 411 and the second slider 421 are attached to the X1 wall 11 and the Y1 wall 13 with respect to the first sensor housing 400A and the second sensor housing 400B, respectively.

The resistor pattern 401 is included in each of the first position detection means ("first position detector") 412 and the second position detection means ("second position detector") 422. The resistor pattern 401 is connected to three external connection terminals T, for example. One of the three external connection terminals T is a common terminal and the other two are detection terminals, and the resistance value between the common terminal and the two detection terminals varies depending on the position of the contact of the sliding contact member 403 with the resistor pattern 401.

The slide block 402 is part of each of the first slider 411 and the second slider 421 and is linearly slidably supported inside the sensor housing 400. The first protrusion pin 411*a* and the second protrusion pin 421*a* each protrude from the slide block 402. The sliding contact member 403 is attached to the sensor housing 400 of the slide block 402. The slide block 402 to which the sliding contact member 403 is attached moves linearly with respect to the sensor housing 400, causing the sliding contact member 403 to slide on the resistor pattern 401. The resistance value varies depending on the contact position of the sliding contact member 403 on the resistor pattern 401. The tilt angle of the swinging body 20 is detected by the resistance value.

A leaf spring member 404 is attached to the peripheral wall 400*b* of the sensor housing 400. The leaf spring member 404 elastically biases the slide block 402 toward the resistor pattern 401. As a result, the slide block 402 is linearly slidably pressed against the sensor housing 400. The elastic biasing force of the leaf spring member 404 ensures that the sliding contact member 403 contacts the resistor pattern 401.

One of the leaf spring member 404 and the slide block 402 has a convex portion 404*a* that is formed protruding toward the other, and the other of the leaf spring member 404 and the slide block 402 has a concave portion 402*a* that is disengageable with the convex portion 404*a*. In the present embodiment, the leaf spring member 404 has the convex portion 404*a* protruding toward the slide block 402, and the slide block 402 has the concave portion 402*a* that is disengageable with the convex portion 404*a*. Each of the convex portion 404*a* and the concave portion 402*a* is provided extending in the Z1-Z2 direction. The convex portion 404*a* and the concave portion 402*a* elastically contacts each other, making it easier for the slide block 402 to return to a predetermined position.

Figure 7A:
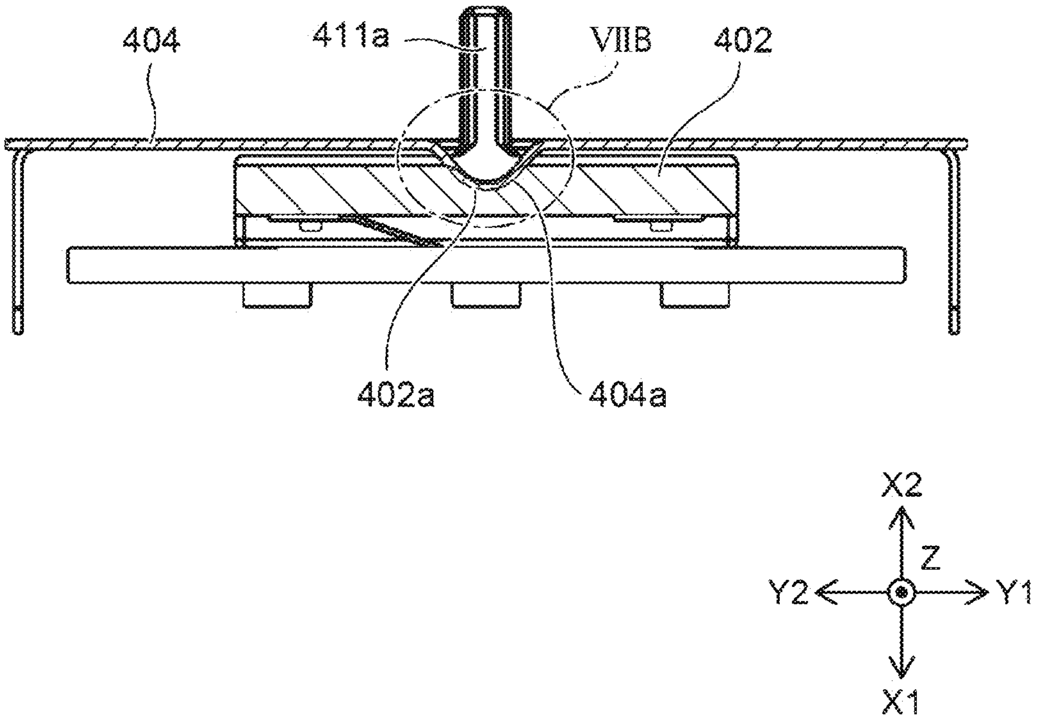
FIG. 7A is a cross-sectional view illustrating the state of engagement of the convex portion and the concave portion.
Figure 7B:
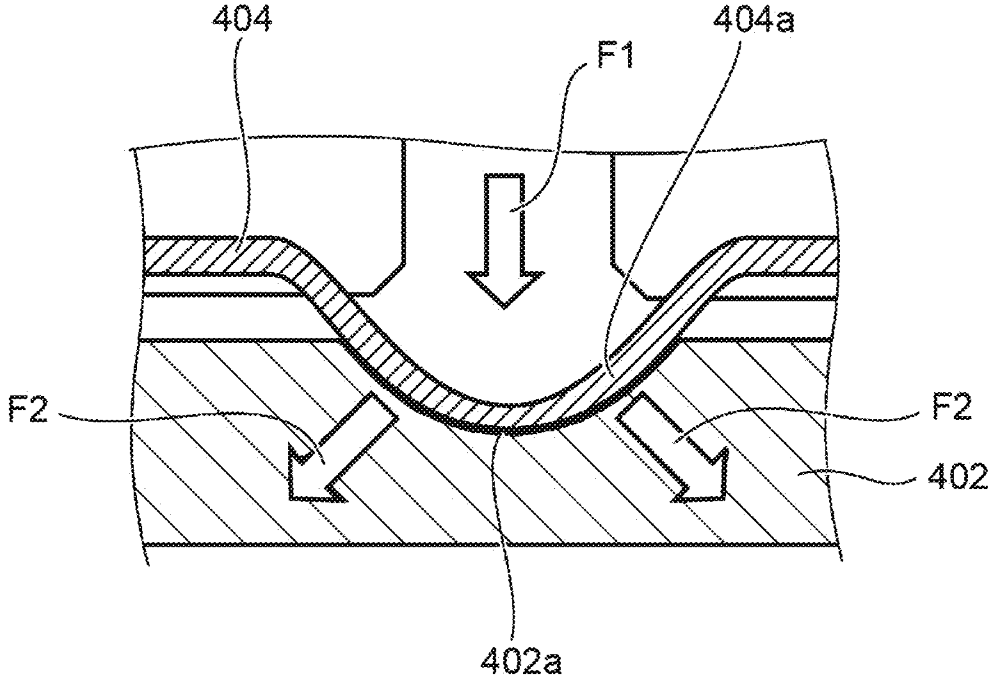
FIG. 7B is an enlarged view of part VIIB shown in FIG. 7A.

FIG. 7A is a cross-sectional view illustrating the state of engagement of the convex portion and the concave portion. FIG. 7A shows a cross-sectional view of the leaf spring member 404 cut in the XY plane direction at the center in the Z1-Z2 direction and when viewed in the Z1 direction. FIG. 7B is an enlarged view of part VIIB shown in FIG. 7A. FIGS. 7A and 7B show the slide block 402 and the leaf spring member 404 of the first detection means 41, and the same is true for the second detection means 42, while only the attachment direction is different. The leaf spring member 404 gives an elastic biasing force to the slide block 402. In the example shown in FIG. 7A, the slide block 402 is pressed toward the X1 direction of the X1-X2 direction by the elastic biasing force from the leaf spring member 404 (see arrow F1 in FIG. 7B).

The slide block 402 is linearly slidable in the Y1-Y2 direction, but when the convex portion 404*a* begins to fit into the concave portion 402*a* during the sliding of the slide block 402, a force in the sliding direction is applied to the slide block 402 (see arrow F2 in FIG. 7B) and the convex portion 404*a* is fitted so as to be attracted into the concave portion 402*a*. This makes it easier for the slide block 402 to return to the position where the convex portion 404*a* and the concave portion 402*a* fit together.

By aligning the position of the slide block 402 where the convex portion 404*a* and the concave portion 402*a* fit together with the neutral position of the swinging body 20, the return of the swinging body 20 to the neutral position can be supported by the return of the position of the slide block 402 by the fit between the convex portion 404*a* and the concave portion 402*a*. Although the swinging body 20 has a mechanism (such as a spring) for returning to the neutral position, the elastic biasing force from the leaf spring member 404 adds resistance to the sliding of the slide block 402. Therefore, even when there is a mechanism for the return of the swinging body 20, the elastic biasing force can be a force that prevents the swing body from returning to the neutral position. The contact resistance of the swinging body 20 and the various parts linked to the swing of the swinging body 20 is also a force that prevents the swinging body 20 from returning to its neutral position. By providing the convex portion 404*a* and the concave portion 402*a* as described above, the return force of the swinging body 20 to the neutral position is assisted by the fitting, and the swinging body 20 can be returned to the neutral position securely and stably.

Error in Position Detection

Figure 8A:
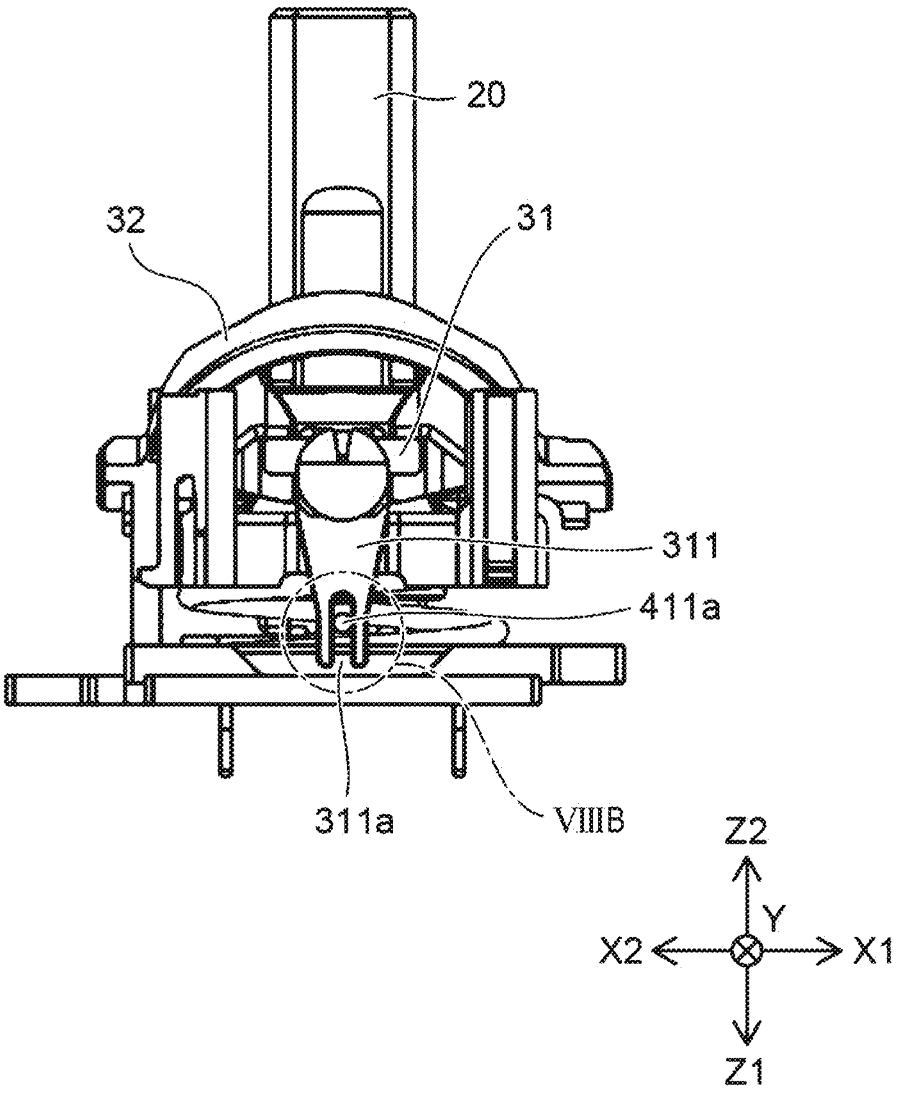
FIG. 8A is a side view illustrating the state of engagement of the first swing arm and the first protrusion pin.
Figure 8B:
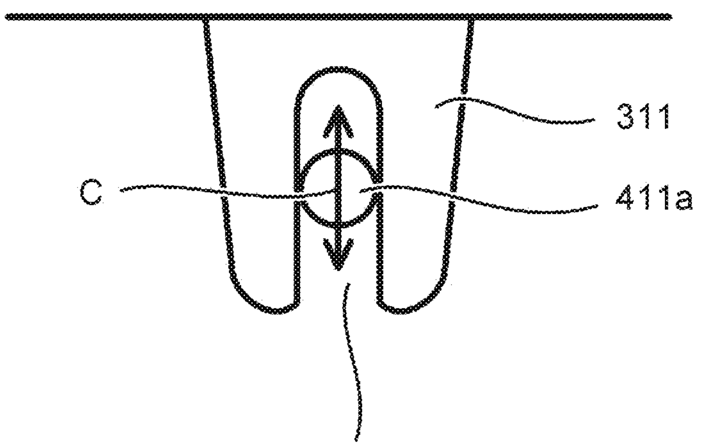
FIG. 8B is an enlarged view of part VIIIB shown in FIG. 8A.

FIG. 8A is a side view illustrating the state of engagement of the first swing arm and the first protrusion pin. FIG. 8B is an enlarged view of part VIIIB shown in FIG. 8A. FIGS. 8A and 8B show the state of engagement of the first swing arm 311 of the first interlocking member 31 and the first protrusion pin 411*a*, and the same applies to the state of engagement of the second swing arm 321 of the second interlocking member 32 and the second protrusion pin 421*a*.

The first swing arm 311 includes the first slit 311*a* extending in the Z1-Z2 direction. In the first swing arm 311, the first protrusion pin 411*a* is fitted into the first slit 311*a*. As a result, a change in the relative positional relationship between the first swing arm 311 and the first protrusion pin 411*a* is allowed in the direction of extension of the first slit 311*a* (see arrow C in FIG. 8B), but not allowed in the X1-X2 direction.

Figure 9A:
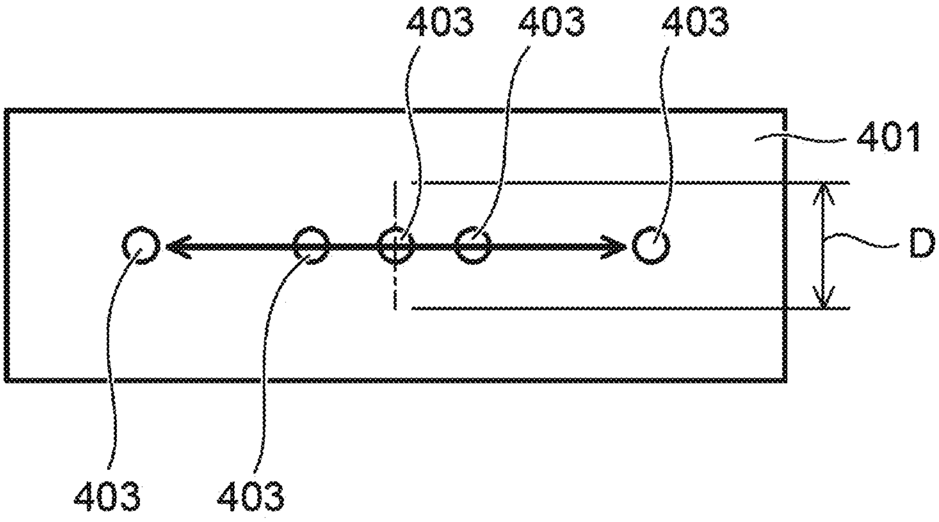
FIG. 9A is a schematic diagram describing the resistance value detection error due to linear sliding between the resistor pattern and the sliding contact member.
Figure 9B:
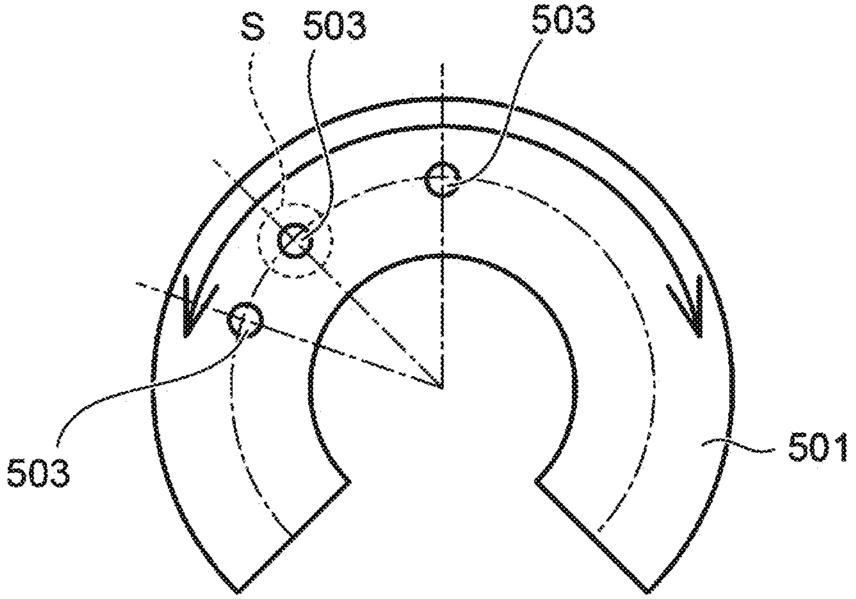
FIG. 9B is schematic diagram describing the resistance value detection error due to arc sliding between the resistor pattern and the sliding contact member.

FIGS. 9A and 9B are schematic diagrams describing the resistance value detection error due to sliding between the resistor pattern and the sliding contact member. FIG. 9A shows the case of linear sliding and FIG. 9B shows the case of circular arc sliding. The resistance value by the resistor pattern 401 varies depending on the position of the sliding contact member 403 that contacts the resistor pattern 401. In the present embodiment, the sliding contact member 403 slides linearly against the resistor pattern 401 to change the resistance value, as shown in FIG. 9A.

On the other hand, the example shown in FIG. 9B is used in a rotary type detection means as shown in Japanese Registered Utility Model No. 3211625, where a sliding contact member 503 moves on a circular arc with respect to a resistor pattern 501 to change the resistance value. As shown in FIGS. 8A and 8B, in the present embodiment, a misalignment of the slide block 402 (see FIG. 6) in the sliding direction (X1-X2 direction) is suppressed by the engagement of the first swing arm 311 of the first interlocking member 31 and the first protrusion pin 411*a*. Therefore, as shown in FIG. 9A, a misalignment of the sliding contact member 403 with respect to the resistor pattern 401 in the sliding direction is suppressed. Here, the misalignment in a direction orthogonal to the sliding direction of the sliding contact member 403 may occur (see arrow D in FIG. 9A). However, the resistance value is dominated by the contact position of the sliding contact member 403 with the resistor pattern 401 in the sliding direction, and any misalignment in the direction orthogonal to the sliding direction has little effect on the resistance value.

In contrast, as shown in FIG. 9B, in the rotary type detection means, the tolerance of the rotary portion with respect to the axis occurs in a circular area centered on the axis, so that the error in the contact point between the sliding contact member 503 and the resistor pattern 501 can also occur in a circular area (see area S shown in FIG. 9B). Therefore, when an error in the contact point between the sliding contact member 503 and the resistor pattern 501 occurs at a position outside the line passing through the center of the arc of sliding motion, the error will appear as a misalignment in the angle of the contact point, which will result in an error in resistance value.

In the present embodiment, the sliding contact member 403 slides on a straight line against the resistor pattern 401, and the engagement of the first swing arm 311 of the first interlocking member 31 and the first protrusion pin 411*a* suppresses a misalignment of the slide block 402 in the sliding direction (X1-X2 direction). Therefore, the resistance value can be detected with high accuracy.

Thus, according to the present embodiment, it is possible to provide the multi-directional input device 1 that can reduce the size of the device as well as improve detection accuracy.

Although the present embodiment is described above, the present invention is not limited to these examples. For example, in the present embodiment, the swinging body 20 is swingably supported with each of the first rotation axis AX1 and the second rotation axis AX2 as the rotation center, but the swinging body may be swingably supported with any one of the rotation axes as the rotation center. A method (magnetic, optical, etc.) other than the resistive type may be used as detection of the position of each the first position detection means 412 and the second position detection means 422. In addition, any addition, deletion, or design modification of components as appropriate by those skilled in the art to each of the aforementioned embodiments, as well as any combination of features of the configuration examples of each embodiment as appropriate, are also included within the scope of the present invention as long as they have the gist of the present invention.

What is claimed is:

1. A multi-directional input device comprising:
- a housing having an X1 wall and an X2 wall disposed opposite to each other along an X direction with an accommodation space interposed therebetween, and a Y1 wall and a Y2 wall disposed opposite to each other along a Y direction orthogonal to the X direction with the accommodation space interposed therebetween;
- a swinging body swingably supported in the accommodation space with the X direction and the Y direction as rotation axes;
- a first interlocking member rotatably supported by the X1 wall and the X2 wall with a first rotation axis parallel to the X direction, the first interlocking member rotating in conjunction with a swing of the swinging body and including a first swing arm extending radially from the first rotation axis;
- a second interlocking member rotatably supported by the Y1 wall and the Y2 wall with a second rotation axis parallel to the Y direction, the second interlocking member rotating in conjunction with a swing of the swinging body and including a second swing arm extending radially from the second rotation axis;
- a first detection unit for detecting a rotation of the first interlocking member, the first detection unit including:
  - a first slider linearly movably supported by the X1 wall such that the first slider is linearly driven by the first swing arm in a direction orthogonal to the X direction; and
  - a first position detector configured to detect a position of the first slider; and
- a second detection unit for detecting a rotation of the second interlocking member, the second detection unit including:
  - a second slider linearly movably supported by the Y1 wall such that the second slider is linearly driven by the second swing arm in a direction orthogonal to the Y direction; and
  - a second position detector configured to detect a position of the second slider, wherein the first position detector includes a resistor pattern disposed linearly along the X1 wall, and wherein the first slider includes a sliding contact member slidably in contact with the resistor pattern and drivable along the X1 wall.

2. The multi-directional input device according to claim 1, wherein the first position detector further includes:
- a sensor housing attached to the X1 wall from outside such that the resistor pattern is disposed therein, the sensor housing including:
  - a flat plate portion parallel to the X1 wall; and
  - a peripheral wall surrounding the flat plate portion and extending in a direction orthogonal to the flat plate portion, and wherein the first slider further includes a slide block to which the sliding contact member is attached, the slide block being linearly slidably supported inside the sensor housing.

3. The multi-directional input device according to claim 2, further comprising:
- a leaf spring member attached to the peripheral wall of the sensor housing and elastically biasing the slide block of the first slider toward the resistor pattern.

4. The multi-directional input device according to claim 3, wherein one of the leaf spring member and the slide block has a convex portion protruding toward the other, while the other of the leaf spring member and the slide block has a corresponding concave portion that is engageable with the convex portion, and wherein the slide block is returned to a predetermined position when the convex portion and the concave portion elastically come into contact with each other.

5. The multi-directional input device according to claim 1, further comprising a first sensor housing attached to the X1 wall and a second sensor housing attached to the Y1 wall, wherein the first slider is linearly movably supported by the X1 wall via the first sensor housing, and the second slider is linearly movably supported by the Y1 wall via the second sensor housing.

6. The multi-directional input device according to claim 1, wherein the second position detector includes a resistor pattern disposed linearly along the Y1 wall, and wherein the second slider includes a sliding contact member slidably in contact with the resistor pattern and drivable along the Y1 wall.

7. The multi-directional input device according to claim 6, wherein the second position detector further includes:

a sensor housing attached to the Y1 wall from outside such that the resistor pattern is disposed therein, the sensor housing including:

a flat plate portion parallel to the Y1 wall; and a peripheral wall surrounding the flat plate portion and extending in a direction orthogonal to the flat plate portion, and wherein the second slider further includes a slide block to which the sliding contact member is attached, the slide block being linearly slidably supported inside the sensor housing.

8. A multi-directional input device comprising:

a housing having an X1 wall and an X2 wall disposed opposite to each other along an X direction with an accommodation space interposed therebetween, and a Y1 wall and a Y2 wall disposed opposite to each other along a Y direction orthogonal to the X direction with the accommodation space interposed therebetween;

a swinging body swingably supported in the accommodation space with the X direction and the Y direction as rotation axes;

a first interlocking member rotatably supported by the X1 wall and the X2 wall with a first rotation axis parallel to the X direction, the first interlocking member rotating in conjunction with a swing of the swinging body and including a first swing arm extending radially from the first rotation axis;

a second interlocking member rotatably supported by the Y1 wall and the Y2 wall with a second rotation axis parallel to the Y direction, the second interlocking member rotating in conjunction with a swing of the swinging body and including a second swing arm extending radially from the second rotation axis;

a first detection unit for detecting a rotation of the first interlocking member, the first detection unit including:

a first slider linearly movably supported by the X1 wall such that the first slider is linearly driven by the first swing arm in a direction orthogonal to the X direction; and a first position detector configured to detect a position of the first slider; and a second detection unit for detecting a rotation of the second interlocking member, the second detection unit including:

a second slider linearly movably supported by the Y1 wall such that the second slider is linearly driven by the second swing arm in a direction orthogonal to the Y direction; and a second position detector configured to detect a position of the second slider, wherein the first position detector is accommodated in a first sensor housing and attached to the X1 wall.

9. The multi-directional input device according to claim 8, wherein the second position detector is accommodated in a second sensor housing and attached to the Y1 wall.

* * * * *